Sept. 11, 1962    C. KLEESATTEL ETAL    3,053,125
ULTRASONIC MULTISTATION OR GANG WELDING
Filed Nov. 16, 1959    2 Sheets-Sheet 1
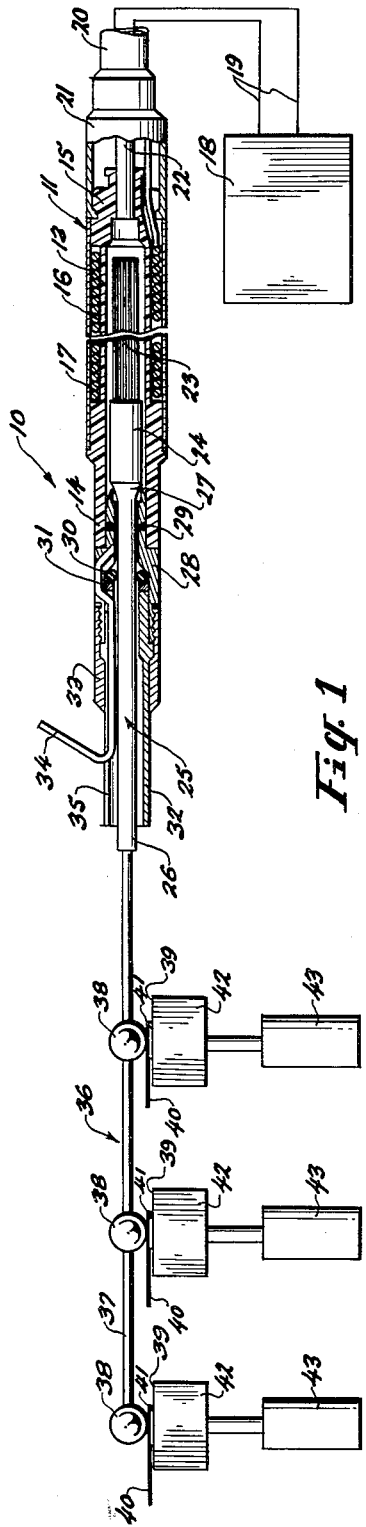
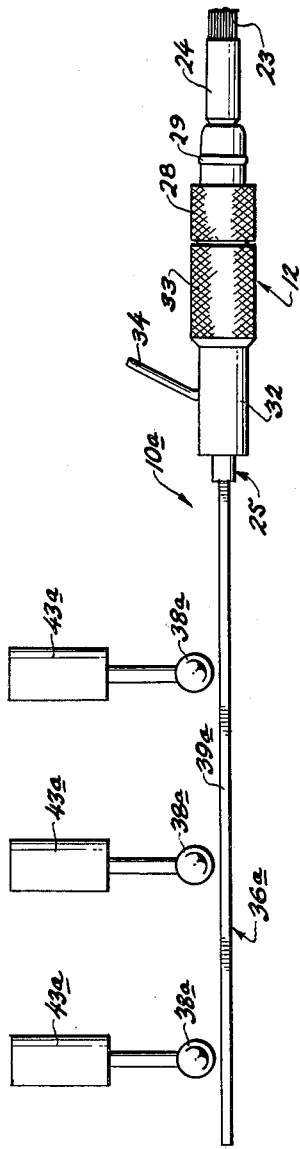
INVENTORS
CLAUS KLEESATTEL, ARTHUR KURIS,
AND LEWIS BALAMUTH.
BY
ATTORNEY

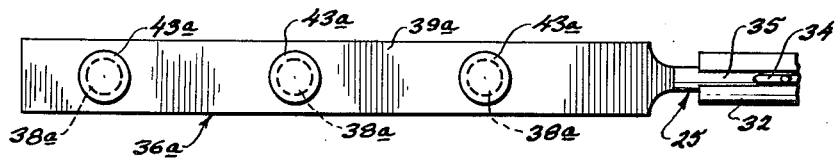
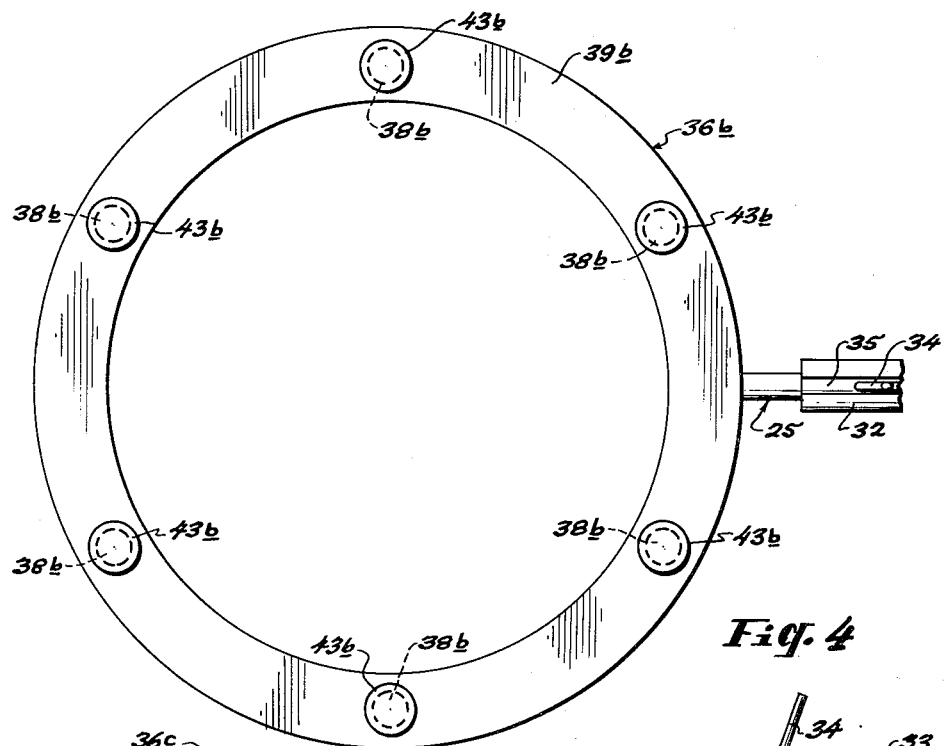
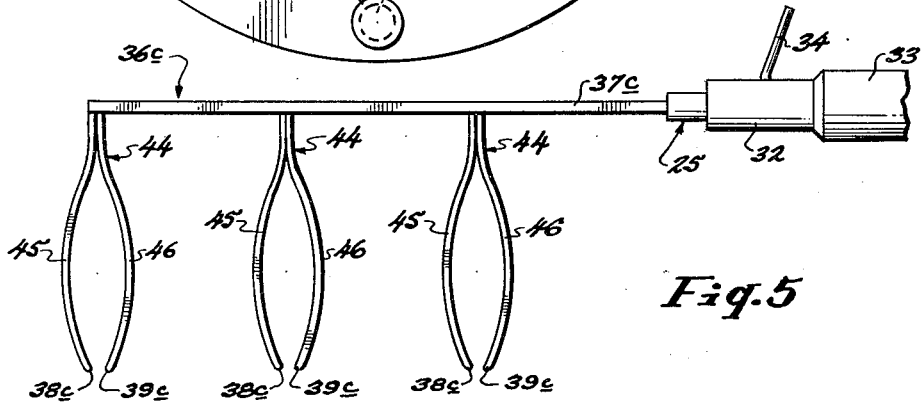
INVENTORS
CLAUS KLEESATTEL, ARTHUR KURIS
AND LEWIS BALAMUTH
BY
ATTORNEY

United States Patent Office 3,053,125
Patented Sept. 11, 1962

3,053,125
ULTRASONIC MULTISTATION OR
GANG WELDING
Claus Kleesattel, Forest Hills, Arthur Kuris, Riverdale, and Lewis Balamuth, Woodside, N.Y., assignors to Cavitron Ultrasonics Inc., New York, N.Y., a corporation of New York
Filed Nov. 16, 1959, Ser. No. 853,173
6 Claims. (Cl. 78—82)

This invention relates generally to ultrasonic welding, and more particularly is directed to the provision of devices for effecting the ultrasonic welding, especially of extremely small or even microscopic elements, simultaneously at a plurality of stations or locations.

Ultrasonic welding of metals generally is known and is essentially a solid state bonding process carried out at ambient temperature, without the aid of solders or fluxes. In existing ultrasonic welding devices, the metals to be joined are placed between two welding tips or sonotrodes, representing a driving sonotrode and a reflecting sonotrode or acoustically dead base, respectively, and are clamped under a static pressure while ultrasonic energy is introduced through the driving sonotrode for a relatively short interval. This arrangement introduces elastic vibratory energy into the joint area with the result that a weld or bond is there formed between the metals. However, the existing ultrasonic welding devices are not adapted for the welding of extremely minute or even microscopic elements simultaneously at a plurality of stations or locations, since such existing devices are not designed to overcome those problems peculiar to the application of ultrasonic welding to the general field of the fabrication of extremely minute elements. By way of illustrating the general field to which ultrasonic welding is to be applied in accordance with the present invention, it may be mentioned that single pieces of semi-conductor material measuring less than ¼ inch by ⅛ inch by ¹⁄₃₂ inch have been formed into complete electronic circuits containing the equivalent of twelve separate components, namely, two transistors, two capacitors, and eight resistors. In manufacturing such minute, and yet complete electronic circuits, it is necessary to attach very fine wire leads, frequently having diameters of less than .002 inch and being barely visible to the naked eye, to extremely small metal terminals or spots fired on the surface of the semi-conductor wafer.

Accordingly, it is an object of this invention to provide ultrasonic welding devices operative to join elements to be welded, especially extremely minute or even microscopic elements, at a plurality of stations or locations simultaneously.

Another object is to provide ultrasonic welding devices having the above mentioned capabilities, and which are adapted to be hand operated or to be embodied in automated machinery.

In accordance with an aspect of this invention, an ultrasonic welding device includes an electromechanical transducer influenced by an alternating magnetic field and thereby made to vibrate at a high frequency and small amplitude, and a connecting body or acoustic impedance transformer extending from the transducer and connected to a transmission member which, at locations preferably spaced apart by a distance equal to one-half wave length, or multiples thereof, at the vibration frequency of the transducer, defines a number of welding stations.

In one embodiment of the invention, the transmission member carries a welding tip, which may be in the form of a small diameter sphere, at each welding station, and the elements to be welded at each station are pressed lightly together between the related welding tip and a cooperating non-vibrated base or welding tip so that elastic vibratory energy is introduced through the vibrated welding tip into the joint area at the small area of contact of the vibrated welding tip with the elements to be welded.

In another embodiment of the invention, a pair of welding tips, in a resilient tweezer-like arrangement, extends from the transmission member at each of the welding stations so that the elements to be welded at each station can be lightly held between the related pair of welding tips while elastic vibratory energy is introduced through the welding tips at the small area of contact of the latter with the elements to be welded.

In still another embodiment of the invention, the transmission member is in the form of a flat-faced, elongated bar or ring, and a non-vibrated welding tip, for example, in the form of a small diameter sphere, confronts a flat face of the bar or ring at each welding station so that elements to be welded at each station can be lightly held between the related non-vibrated welding tip and the confronting face of the bar or ring while elastic vibratory energy is introduced through the vibrated bar or ring at the joint area defined by the small area of contact of the related non-vibrated welding tip with the elements to be welded.

A further object of the invention is to provide ultrasonic welding devices of the described character wherein the transmission member defining the several welding stations is interchangeable with other transmission members or welding tips or with other work tools; and wherein the transmission member is rigidly joined, in end to end relationship, to the connecting body or acoustic impedance transformer and to a transducer to form an insert unit or assembly which is removably supported in a housing containing a coil in surrounding relationship to the transducer and receiving a biased alternating current for producing an alternating electromagnetic field, as in the type of acoustically vibrated material treating devices disclosed in the co-pending application for United States Letters Patent, Serial No. 758,069, filed August 29, 1958, by Lewis Balamuth, Arthur Kuris and Claus Kleesattel.

The above, and other objects, features and advantages of the invention, will be apparent in the following detailed description of illustrative embodiments thereof which is to be read in connection with the accompanying drawings forming a part hereof, and wherein:

FIG. 1 is a side elevational view, partly broken away and in axial section, of an ultrasonic welding device having a number of simultaneously operative welding stations in accordance with the present invention;

FIG. 2 is a fragmentary side elevational view similar to a part of FIG. 1, but showing another arrangement of the transmission member defining the several welding stations;

FIG. 3 is a top plan view of the arrangement illustrated in FIG. 2, but with actuating devices for the non-vibrated welding tips being eliminated for the sake of clarity;

FIG. 4 is a view similar to that of FIG. 3, but showing another embodiment of the invention; and FIG. 5 is a view similar to that of FIG. 2, but showing still another embodiment of the invention.

Referring to the drawings in detail, and initially to FIG. 1 thereof, it will be seen that an ultrasonic welding device having a number of simultaneously operative welding stations in accordance with the present invention, and there generally identified by the reference numeral 10, may include a tubular housing 11 into which an insert unit 12 is partially telescoped.

The housing 11, as in our above identified, prior filed application, Serial No. 758,069, includes a tubular casing 13 preferably formed of molded plastic, such as, nylon or the like, and having an inner wall surface which is relatively smooth and of uniform diameter throughout. The casing 13 has an extension 14, at one end, through which insert unit 12 can extend into the casing, while the other, or tail end of casing 13 terminates in a nipple portion 15. A winding 16 of current conducting wire, such as, copper or the like, which is protected by an enamel coating is wound on the outside of tubular casing 13 and is enclosed and protected by an outer jacket 17 which may be formed of extruded plastic tubing. The plastic material of casing 13 does not impede the establishment of an alternating electromagnetic field within the tubular casing upon excitation of the exterior winding or coil 16. The biased alternating current for exciting winding 16 is supplied to the latter from a suitable generator 18 by way of wire leads 19 which are housed in a protective flexible conduit 20 connected to the nipple portion 15 of casing 13 by an adapter 21. Conduit 20 also contains a tube 22 by which a coolant may be supplied through nipple portion 15 to the interior of tubular casing 13.

The insert unit 12 is made up of a mechanical vibrator that includes a transducer 23 designed to be telescoped within tubular casing 13 with winding 16 in surrounding relation thereto. The transducer 23 may be any one of a number of electromechanical types, such as, electrodynamic, piezo-electric or magnetostrictive, however, for the operating range of frequencies most desirable for ultrasonic welding of minute elements, transducer 23 is preferably of the magnetostrictive type. The magnetostrictive transducer 23 is preferably formed of a metal, such as, permanickel, nickel, premendur, or other metals which have high tensile strength and are highly magnetostrictive in character, so that it will vibrate to a maximum degree when subjected to the influence of the alternating electromagnetic field established by the biased alternating current supplied to winding 16.

In the embodiment shown in FIG. 1, transducer 23 comprises a stack of strips of the selected metal secured together at one end, while the other end of the transducer is rigidly fixed, as by brazing solder, to a head 24 of an acoustic impedance transformer generally identified by the reference numeral 25 and also forming part of the mechanical vibrator.

In place of the stack of metal strips forming the transducer 23 in the illustrated embodiment of the invention, there may be substituted a bundle of metal wires or rods, preferably of rectangular cross-section so that they can be compactly assembled together, a roll of metal foil, or a longitudinally split hollow metal tube. In any case, the length of the magnetostrictive transducer 23 is selected so that it will be a half wave length, or multiples thereof, at the frequency of the alternating electromagnetic field established within tubular casing 13 by winding 16.

The acoustic impedance transformer or connecting body 25 may be made of a strong metal, such as, steel, Monel metal, titanium, Phosphor-bronze, brass or beryllium copper, and further includes a stem 26 integrally joined to the head 24 by a tapered neck 27. The length of stem 26 is sufficient so that it will project out of housing 11 when insert unit 12 is assembled to housing 11 with transducer 23 telescoped within casing 13.

In the embodiment of the invention illustrated in FIG. 1, the removable insert unit 12 further includes a tubular retainer 28 extending loosely around stem 26 and having a reduced diameter neck dimensioned to telescope snugly into extension 14 of casing 13, and to abut, at its edge, against tapered neck 27. A resilient O-ring 29 is set within a groove extending around the reduced neck of retainer 28, and provides a liquid seal between the neck and extension 14.

A second resilient O-ring 30 fits snugly around stem 26 of transformer 25 and is driven axially into abutment against an internal shoulder of tubular retainer 28 by a metal ring 31 which fits loosely over the transformer stem 26. The portion of stem 26 extending beyond retainer 28 may be protected by a guard member 32 having a throat telescoping snugly into retainer 28 and thus supported by the latter. The protective guard member 32 is held in assembled relation to retainer 28 by means of a sleeve 33 engaging an external shoulder 34 on guard member 32 and having a threaded connection with retainer 28 so that, when sleeve 33 is tightened on retainer 28, guard member 32 is drawn axially into retainer 28 and acts, at its inner edge, against metal ring 31 which is, in turn, pressed against resilient O-ring 30 to radially expand the latter. The expanded O-ring 30 provides a fluid seal between stem 26 and the bore of retainer 28, and additionally provides the sole support for the mechanical vibrator formed by transformer 25 and transducer 23 at approximately a node of movement thereof so that the vibrations of high frequency and low amplitude are not dampened or transmitted to the housing.

It will be apparent that the entire insert unit 12 may be disconnected from housing 11 by merely exerting an outward pull thereon sufficient to withdraw the reduced neck and associated O-ring 29 of retainer 28 from extension 14 of casing 13. The entire insert unit 12 may likewise be attached to the housing 11 in a leak-proof manner merely by telescoping the reduced neck and O-ring 29 of retainer 28 into extension 14. Thus, interchangeable insert units constructed in the above described manner and equipped with welding station defining transmission members of different kinds and shapes, as hereinafter described in detail, can be quickly applied and removed from the housing 11 as desired.

Since the transducer 23 is subjected to heating after prolonged operation and most effectively serves its purpose when maintained in relatively cool condition, the flow of cooling fluid, such as, water or cold air, from tube 22 is directed into the interior of casing 13 containing the transducer, and such flow of cooling fluid also maintains the outer jacket 13 at approximately room temperature so that it can be comfortably grasped. The cooling fluid supplied to the interior of casing 13 is permitted to bleed into the bore of retainer 28 through one or more notches (not shown) in the edge of the reduced diameter neck of the retainer, and is discharged from the bore of retainer 28 through a bent tube 34 which bypasses rings 30 and 31 and then extends outwardly through a longitudinal slot 35 in guard member 32. The discharge tube 34 may be connected to flexible tubing (not shown) for carrying the discharged cooling fluid away from the welding area.

In accordance with the present invention, the welding device 10 further includes a transmission member, generally identified by the reference numeral 36, which defines a number of welding stations at which elastic vibratory energy may be simultaneously introduced into elements to be welded at the several stations.

In the embodiment illustrated in FIG. 1, the transmission member 36 includes an elongated bar or rod 37 rigidly joined at one end, as by brazing solder, to the output end of stem 26 of transformer 25 and, thus, forming an axial extension of the latter.

A number of welding tips 38 are secured on rod 37 at spaced apart locations along the latter. As shown in FIG. 1, each welding tip 38 may be in the form of a metal sphere having rod 37 extending diametrically therethrough and may be secured to the rod by brazing solder. The welding tips are located along rod 37 so as to be vibrated in response to the transmission of vibrations from transformer 25 to rod 37. Thus, welding tips 38 are preferably located at longitudinal loops of motion of rod 37, that is, with the distance between the successive welding tips being equal to a half-wave length, or a multiple thereof, at the frequency of operation of transducer 23.

With the above described arrangement, the several welding tips 38 are vibrated simultaneously in directions parallel to the aligned longitudinal axes of transformer 25 and rod 37, and serve to define the several welding stations of the device. A back-up surface 39 representing a non-vibrated welding tip confronts each of welding tips 38 and lies in a plane parallel to the axis of rod 37, that is, parallel to the directions of vibration of the related welding tip 38 so that, when metal elements to be welded, for example, a fine wire 40 and a thin foil plate 41, are lightly held between each welding tip 38 and the related back-up surface 39, the vibrational stroke of each welding tip 38 in contact with one of the elements to be welded introduces elastic vibratory energy into the joint at the small area of contact with the spherical surface of the welding tip and, so long as the introduced energy is sufficiently high, a strong welded joint is formed at each welding station.

However, it has been found that, particularly in welding extremely minute elements, certain limitations must be observed with respect to the amplitude and frequency of the vibratory energy. Specifically, the vibratory stroke must be less than the minimum dimension of the smaller of the two elements being welded to each other, and is preferably one-tenth or less than such minimum dimension. Having in mind the foregoing limitation with respect to the vibratory stroke, it is apparent that the operating frequency must be suitably selected so as to obtain the introduction of sufficient elastic vibratory energy for establishing welding conditions at the joint area. It has been found that, if the minimum dimension of the elements to be welded is larger than .002 inch, an operating frequency range in the order of 20,000 to about 30,000 cycles per second will be sufficient to effect the necessary weld. However, if the minimum dimension is less than .002 inch, an operating frequency range between 60,000 and about 80,000 cycles per second is preferred.

The amplitude of the vibratory movement imparted to the welding tips of transmission member 36 may be held to the desired limits by suitably designing and proportioning acoustic impedance transformer 25. Thus, transformer 25 can be designed to magnify the amplitude of the vibrations delivered thereto by transducer 23 or to decrease the amplitude of the vibrations introduced into member 36 to a value lower than the amplitude at the end of transformer 25 attached to transducer 23. When the transformer has a larger cross-sectional area at the end to which the transducer is attached than at the end to which the welding tip is attached, as in FIG. 1, the amplitude of the vibrations delivered to transmission member 36 is correspondingly amplified or increased, and, conversely, when the transducer attached end of transformer 25 has a smaller cross-sectional area than the opposite end thereof, the amplitude of vibration of transmission member 36 has a correspondingly smaller value than the amplitude of vibrations received from transducer 23. Thus, by a proper proportioning of the cross-sectional areas of the vibration receiving end and vibration delivering end of transformer 25, the welding tips 38 of transmission member 36 may be given a wide range of vibratory strokes at the frequency of vibration of transducer 23.

With each welding tip 38 disposed approximately at a longitudinal loop of motion of transmission member 37, and with welding tip or surface 39 being isolated from the vibratory movement of the transmission member, it will be apparent that relative movement will occur between the associated welding tips and the elements to be welded which are held lightly therebetween, and also between the elements to be welded, and such relative movement is accompanied by frictional heating to produce the desired welding action.

In order to avoid welding of each vibrated tip 38 and the related non-vibrated tip or surface 39 to the elements to be welded, it is necessary that the welding tips and surfaces be made of a metal having a higher melting point than the melting point of the metals forming the elements to be welded. Further, it is preferable that the welding tips and associated back-up surfaces be of a metal which is non-wettable by the metals of the elements to be welded, thereby to avoid adhesion of the latter to each of welding tips 38 and to the associated surface 39 upon cooling of the melted weld metal.

In the arrangement illustrated in FIG. 1, each vibrated welding tip 38 has an individual surface 39 associated therewith and forming one face of a related base or block 42 mounted for movement perpendicular to the longitudinal axis of rod 37, for example, by a fluid pressure actuated cylinder or solenoid 43, so that each surface 39 can be normally spaced from the associated vibrated welding tip 38 to permit the insertion of the elements to be welded therebetween, whereupon the base or block 42 is moved towards the related welding tip 38 to lightly hold the elements to be welded between tip 38 and surface 39.

It will be apparent that, when the surfaces 39 are formed on individual bases or blocks 42, as in FIG. 1, welding operations can be performed simultaneously, or independently of each other at the several welding stations. However, if it is intended that the welding operations should be always performed simultaneously at the several welding stations, then a single base or block providing a back-up surface associated with all of the welding tips 38 can replace the individual bases or blocks 42 of FIG. 1.

It is also apparent that, with the illustrated arrangement having individual bases or blocks 42, the several welding stations can be employed for performing welding operations on different elements to be welded at each of the stations, or the same elements to be welded can extend between the welding tips 38 and surfaces 39 at the several stations in order to produce welded joints at locations spaced apart along the elements to be welded in accordance with the spacing between the successive welding tips 38 on rod 37 of transmission member 36.

Although the transmission member 36 of welding device 10 shown in FIG. 1 has the spherical welding tips 38 secured on the rod 37 thereof to define the desired small areas of contact with the elements to be welded at the several welding stations located at longitudinal loops of motion of the transmission member, and such vibrated welding tips are associated with non-vibrated welding tips in the form of flat surfaces 39, it will be appreciated that the mountings for the spherical welding tips and for the associated flat surfaces, respectively, may be reversed. Thus, as shown in FIGS. 2 and 3, a welding device 10a constructed in accordance with another embodiment of the invention may have its transmission member 36a extending from the transformer 25 in the form of an elongated bar presenting a flat surface 39a having vibrational movement at locations along the latter corresponding to longitudinal loops of motion, while non-vibrated welding tips 38a, in the form of small diameter spheres, confront the surface 39a at the locations of such longitudinal loops of motion corresponding to the desired welding stations, and are mounted for movement toward and away from surface 39a, as by fluid pressure operated cylinders or solenoids 43a.

It will be apparent that, with the arrangement illustrated in FIGS. 2 and 3, elements to be welded may be placed and lightly held between each non-vibrated welding tip 38a and the adjacent vibrated area of the surface 39a to cause elastic vibratory energy to be introduced into the elements to be welded from transmission member 36a at the joint area defined by the small area of contact of the spherical surface of welding tip 38a with the elements to be welded. As in the first described embodiment of the invention, the several non-vibrated welding tips 38a may be jointly actuated toward and away from the surface 39a of transmission member 36a, so that simultaneous welding operations are then performed at the several welding stations.

It is also to be noted that, in the embodiment of FIG. 1, the flat-surfaced blocks 42 may be replaced by spherical non-vibrated welding tips, as in FIGS. 2 and 3, to cooperate with the spherical welding tips carried by the transmission member.

Although the embodiments of the invention described above with reference to FIG. 1 and FIGS. 2 and 3, respectively, incorprate rectilinear transmission members having the several welding stations spaced apart longitudinally therealong at locations corresponding to longitudinal loops of motion, reference to FIG. 4 of the drawings will show that other arrangements of the welding stations are possible in accordance with the invention. Thus, in FIG. 4, the welding device 10b includes a transmission member 36b in the form of a ring with a flat annular surface 39b. The ring-shaped transmission member is secured, as by brazing, at its outer periphery to the outlet end of transformer 25 with the longitudinal axis of the transformer extending radially with respect to the transmission ring. With the arrangement illustrated in FIG. 4, the vibrations at the outlet end of transformer 25, which outlet end is at a longitudinal loop of motion of the transformer, result in radially directed vibrational movement at locations spaced apart circumferentially on the flat surface 39b. Such locations of the radial vibrations of surface 39b correspond to the several desired welding stations, and, in the illustrated embodiment, non-vibrated, spherical welding tips 38b corresponding to the welding tips 38a of FIGS. 2 and 3, and suitably actuated in the same manner, are disposed above surface 39b at the locations of the several welding stations.

It will be apparent that, with the arrangement of FIG. 4, elements to be welded may be lightly held between the non-vibrated welding tips 38b and the corresponding radially vibrated areas of the surface 39b to cause the introduction of elastic vibratory energy from transmission member 36b into the joint areas of the elements to be welded defined by the small areas of contact between the latter and the spherical surfaces of welding tips 38b.

It is also apparent that the spherical welding tips 38b may be secured on ring-shaped transmission member 36b at the locations of the radially directed vibrational movements, and will then cooperate with non-vibrated flat surfaces, as in the embodiment of FIG. 1.

Although the above described embodiments of the invention perform welding operations at each of the several welding stations between a vibrated welding tip or surface and a related non-vibrated welding tip or surface, reference to FIG. 5 of the drawings will show that, in accordance with the invention, ultrasonic welding can be effected at each of the several stations between a related pair of welding tips which are simultaneously vibrated from a common transmission member.

In the arrangement of FIG. 5, the transmission member 36c includes an elongated bar or rod 37c joined coaxially, as by brazing, to the outlet end of transformer 25, and pairs of tweezers 44 secured to bar or rod 37c at locations spaced apart along the latter and representing the several welding stations. Each of the tweezers 44 is formed by two joined together resilient arms or prongs 45 and 46 having free ends of small dimensions representing the welding tips 38c and 39c at the related welding station.

Although each pair of tweezers 44 has its axis of symmetry extending generally perpendicular to the longitudinal axis of bar or rod 37c, it has been found that vibratory movement is nevertheless imparted to the weldings tips 38c and 39c at the free ends of prongs 45 and 46 of each welding station so that, when elements to be welded are held lightly between welding tips 38c and 39c, the vibratory movement produces the necessary frictional heating for welding together the elements.

In the described embodiments of the invention, the transmission members carrying vibratory energy to the several welding stations are integral parts of removable insert units intended for interchangeable use in association with the housing 11 of FIG. 1. However, it is to be understood that such transmission members need not be made integral with the transformer and transducer to form interchangeable units in the described manner, and may be associated with other conventional devices for introducing the vibratory energy to the transmission members at the requisite high frequency and small amplitude.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:
1. An ultrasonic, multi-station welding tool comprising a transmission member receiving ultrasonic vibrations and having a length equal to at least two times a whole multiple of a half-wavelength of the compressional waves generated in said transmission member by said ultrasonic vibrations so that loops of vibrational movement occur at a plurality of locations along said transmission member, and means at each of said locations defining a pair of welding surfaces movable toward and away from each other for grasping elements to be welded therebetween, at least one of said welding surfaces of each pair thereof being connected to said transmission member at the related location along the latter to receive said vibrational movement for introducing elastic vibratory energy into the elements to be welded which are grasped between each pair of welding surfaces.

2. An ultrasonic, multi-station welding tool as in claim 1; wherein said means at each of said locations defining a pair of welding surfaces includes a pair of resilient arms extending in side-by-side relation from said transmission member and being secured to the latter at the related location along the transmission member, said arms having adjacent free ends movable toward and away from each other and defining said welding surfaces.

3. An ultrasonic, multi-station welding tool as in claim 1; wherein said transmission member lies in a flat plane and the vibrational movement at each of said locations is in directions parallel to said plane; and wherein said means at each of said locations defining a pair of welding surfaces includes a surface area of said transmission member and a spherical member movable toward and away from said surface area of the transmission member at the related location in directions perpendicular to said plane.

4. An ultrasonic, multi-station welding tool as in claim 1; wherein said means at each of said locations defining a pair of welding surfaces includes a spherical member secured on said transmission member to undergo said vibrational movement with the latter, and a base member movable toward and away from said spherical member at the related location and having a small area of contact therewith.

5. An ultrasonic, multi-station welding tool as in claim 1; wherein said transmission member is substantially straight and receives said ultrasonic vibrations at one end thereof.

6. An ultrasonic, multi-station welding tool as in claim 1; wherein said transmission member is in the form of a ring and said ultrasonic vibrations are received radially at the periphery thereof so that said vibrational movements are directed radially at each of said locations.

References Cited in the file of this patent
UNITED STATES PATENTS

| | | |
|---|---|---|
| 2,573,168 | Mason | Oct. 30, 1951 |
| 2,632,858 | Calosi | Mar. 24, 1953 |
| 2,874,470 | Richards | Feb. 24, 1959 |
| 2,891,178 | Elmore | June 16, 1959 |
| 2,939,384 | Barnes | June 7, 1960 |
| 2,985,954 | Jones | May 30, 1961 |

OTHER REFERENCES

"Ultrasonic Welding of Aluminum," Welding Journal, October 1959, pages 969–975.